United States Patent [19]

Chang

[11] Patent Number: 5,694,594
[45] Date of Patent: Dec. 2, 1997

[54] SYSTEM FOR LINKING HYPERMEDIA DATA OBJECTS IN ACCORDANCE WITH ASSOCIATIONS OF SOURCE AND DESTINATION DATA OBJECTS AND SIMILARITY THRESHOLD WITHOUT USING KEYWORDS OR LINK-DIFINING TERMS

[76] Inventor: Daniel Chang, 2611 Hastings Dr., Belmont, Calif. 94002

[21] Appl. No.: 338,645

[22] Filed: Nov. 14, 1994

[51] Int. Cl.$^6$ .................................................. G06F 13/00
[52] U.S. Cl. ........................ 395/606; 395/602; 395/603; 395/610; 395/614; 395/200.09
[58] Field of Search ................. 395/157, 50, 600, 395/602, 54, 606, 603, 610, 614, 200.19; 364/419.19

[56] References Cited

U.S. PATENT DOCUMENTS

| | | | |
|---|---|---|---|
| 5,204,947 | 4/1993 | Bernstein et al. | 395/157 |
| 5,297,042 | 3/1994 | Morita | 364/419.19 |
| 5,297,249 | 3/1994 | Bernstein et al. | 395/156 |
| 5,355,472 | 10/1994 | Lewis | 395/600 |
| 5,434,952 | 7/1995 | Yen et al. | 395/50 |
| 5,446,891 | 8/1995 | Kaplan et al. | 395/600 |

OTHER PUBLICATIONS

Johnson et al, "Automatic Touring in a Hypertest System", Jul. 1993, pp. 524-530.
Vetter, "Mosaic and the World-Wide Web", Oct. 1994, pp. 49-57.
Satou et al, "A New Type Hypermedia Platform for Industrial Applications", Mar. 1993, pp. 2262-2265.
Garzotto et al, "Navigation Patterns in Hypermedia Data Bases", 1993, pp. 370 379.
Tanaka et al, "Query Pairs As Hypertext Links", 1991, pp. 456-463.

*Primary Examiner*—Thomas C. Lee
*Assistant Examiner*—Le Hien Luu
*Attorney, Agent, or Firm*—Bo-In Lin

[57] ABSTRACT

A networked data-handling system including a plurality of processor-database units is disclosed in this invention. Each processor-database unit includes a many structured data objects. Each structured data object contains retrievable user requested data stored in the data base of that unit. The networked system includes an user interface for allowing an user to enter and modify a plurality of query requests and link instructions. The networked system further includes a link generator for receiving and executing the query requests and the link instructions for generating links between the structured data object distributed among the networked processor-database units for retrieving the retrievable user requested data from the linked structured data object The link generator further includes a user profile generator for accumulating and employing the query requests and link instructions for generating a user profile filtering file. The link generator further includes an experience-based link creating unit for applying the accumulated query requests and link instructions and the user profile filtering file for generating a recommended links.

10 Claims, 14 Drawing Sheets

Chapter

Section

Paragraph a

Paragraph b

FIG. 3

| Terms | Document Frequency |
|---|---|
| color | 62 |
| model | 48 |
| black | 47 |
| value | 37 |
| jury | 37 |
| defense | 37 |
| class | 37 |
| beating | 32 |
| verdict | 32 |
| law | 30 |
| force | 24 |
| African | 24 |
| cops | 20 |
| riots | 19 |
| violence | 17 |
| simi | 17 |
| video | 16 |
| rodney | 14 |
| trial | 13 |
| poverty | 12 |

FIG. 5

SYSTEM FOR LINKING HYPERMEDIA DATA OBJECTS IN ACCORDANCE WITH ASSOCIATIONS OF SOURCE AND DESTINATION DATA OBJECTS AND SIMILARITY THRESHOLD WITHOUT USING KEYWORDS OR LINK-DIFINING TERMS

BACKGROUND OF THE INVENTION

1. Field of the Invention

This invention relates generally to design method of network configurations for data input/output (I/O) management in a computer network system. More particularly, this invention relates to design method of network configurations for managing data search and retrieval wherein an experience-based automatic link generation is implemented on hierarchical hyper-document networks which is facilitated by employing a user profile filter database.

2. Description of the Prior Art

In performing a task of data search and retrieval on an automatic link generation network system, user's need is either ignored or a requirement is imposed on an user to explicitly enter a set of key words and queries to invoke specific system actions. Among the searched documents distributed in a plurality of networked databases, a user's task to search and retrieval relevant information is often confronted with two conflicting considerations. The processing time can be reduced and the retrieval can be expeditiously completed by entering single key words and documents shared these single key words can be easily located. However, this type of search on a network often generates two many links and the documents retrieved by use of this method are of low search precision. On the other hand, a search can be performed among these networked data bases by applying a duster of key words and only documents which share those duster keywords are retrieved. This type of search can usually achieve higher precision but requires longer processing time and workable only with processors with higher level of processing power. Due to these difficulties, in an automatic link generation networked system, a user's interest for retrieval of relevant information is generally not satisfied in searching multiple documents distributed in several connected nodes.

One method to reduce the disorientation of automatic link generation is to limit the number of links or by attaching attributes to the links. The pre-assigned link attributes are then employed to group, sort, and filter a link generation request, Due to the pre-assignment nature of these link attributes, a user's interest is often ignored. The organization and filtering in link generation in response to a user's search request by employing the pre-assigned link attributes may not directly related or even relevant to a user's search interest since the link attributes which are pre-assigned are not directly correlated with the search undergoing with user's specific request and search patterns or profiles. The pre-assigned link attributes therefore can not reflect the experiences and special interest of the user applying the networked system for information search and data retrieval.

Therefore, there is still a need in the art of configuration design and management of the networked processors and databases for enhancement of information retrieval to implement an improved and novel link generation management system. The automatic link generation management system must be able to directly and dynamically respond to a user's real time requests by continuously and interactively updating and referencing to user specific experience-based link profile. A user's interest including the past search patterns and accumulated link attributes generated during the entire history of searches can be My applied to facilitate the automatic link generation.

SUMMARY OF THE PRESENT INVENTION

It is therefore an object of the present invention to provide an improved network configuration management system capable of interactively and dynamically performing automatic link generation in response to a user's requests for data retrieval from a plurality of networked processors and databases such that the aforementioned difficulties and limitations in the prior art can be overcome.

Specifically, it is an object of the present invention to provide a network configuration management system capable of interactively and dynamically performing automatic link generation in response to a user's requests for data retrieval from a plurality of networked processors and databases wherein the link generation is performed by using a user link profile of the exiting links such that the user interests are fully accounted for.

Another object of the present invention is to provide a network configuration management system capable of interactively and dynamically performing automatic link generation in response to a user's requests for data retrieval from a plurality of networked processors and databases wherein the links are generated with flexible anchor granularity.

Another object of the present invention is to provide a network configuration management system capable of interactively and dynamically performing automatic link generation in response to a user's requests for data retrieval from a plurality of networked processors and databases wherein the links are generated interactively whereby a user can have real-time control over the link generation and the entire search processes.

Briefly, in a preferred embodiment, the present invention includes a networked data-handling system including a plurality of processor-database units wherein each includes a plurality of structured data objects. Each structured data object contains retrievable user requested data therein. The networked system includes an user interface for allowing an user to enter and modify a data retrieval request based on a plurality of profile models, profile modifications and link instructions. The networked system further includes a link generator for receiving and executing the data retrieval request based on the profile models, profile modifications and the link instructions for generating links between the structured data object distributed among the networked processor-database units for retrieving the retrievable user requested data from the linked structured data object. The link generator flier includes a user profile generating means for accumulating and employing the profile models, profile modifications and link instructions for generating a user profile filtering file. The link generator further includes an experience-based link creating means for applying the accumulated profile models, profile modifications, and link instructions and the user profile filtering file for generating a recommended links.

It is an advantage of the present invention is that it provides a network configuration management system capable of interactively and dynamically performing automatic link generation in response to a user's requests for data retrieval from a plurality of networked processors and databases wherein the link generation is performed by using a user link profile of the exiling links such that the user interests are fully accounted for.

Another advantage of the present invention is that it provides a network configuration management system capable of interactively and dynamically performing automatic link generation in response to a user's requests for data retrieval from a plurality of networked processors and databases wherein the links are generated with flexible anchor granularity.

Another advantage of the present invention is that it provides a configuration management system capable of interactively and dynamically performing automatic link generation in response to a user's requests for data retrieval from a plurality of networked processors and databases wherein the links are generated interactively whereby a user can have real-fie control over the link generation and the entire search processes.

These and other objects and advantages of the present invention will no doubt become obvious to those of ordinary skill in the art after having read the following defied description of the preferred embodiment which is illustrated in the various drawing figures.

BRIEF DESCRIPTION OF THE DRAWINGS

FIG. 3 shows the structure of a hypermedia documents;

FIG. 5 shows the discriminating terms selected by the indexer;

DETAILED DESCRIPTION OF THE PREFERRED EMBODIMENT

Figure 1:
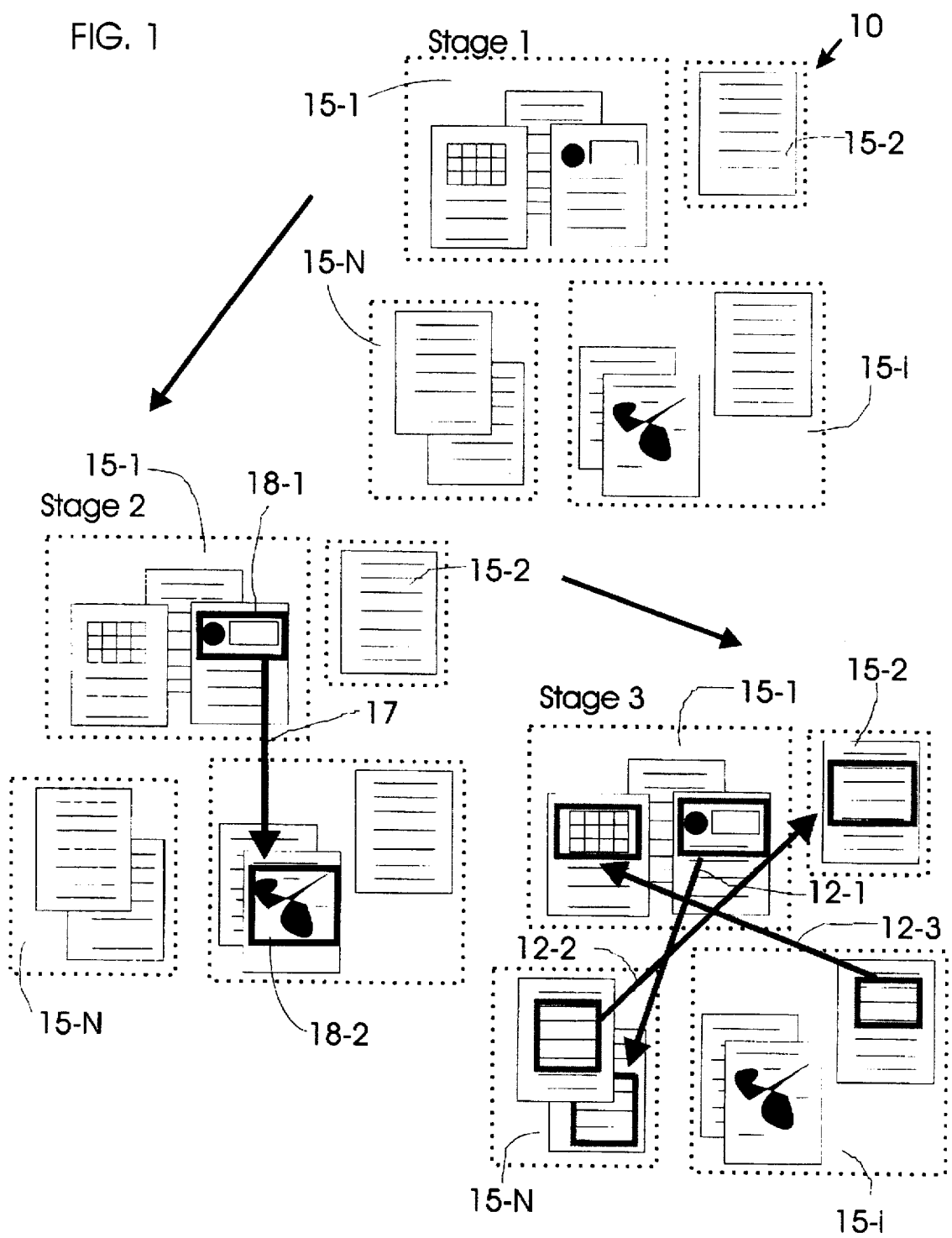
FIG. 1 is a functional block diagram showing the system configuration of a networked data processing system of the present invention.

FIG. 1 is a functional block diagram for illustrating the network configurations at three stages according to the operations performed by an automatic link generator of the present invention. The automatic link generator is implemented in a networked data handling system 10 for generating hypermedia links 12-1, 12-2, 12-3, etc., as that shown in the third stage of the network configuration. The networked data-handling system 10 includes a plurality of processor-database units, e.g., 15-1 to 15-N where N is a positive integer. In the first stage, i.e., stage-I, a user browses several hypermedia documents in the networked data-handling system 10 and identifies two hypermedia nodes, e.g., hypermedia nodes 18-1 and 18-2 which the user considers a link between the contents of these two documents would suit the objectives of searches on this networked data handling system 10. In the second stage, i.e., stage-II, the user creates a user generated link 17 to link the user selected hypermedia nodes 18-1 and 18-2. Then in the third stage, i.e., stage-3, a link generator of the present invention generates a plurality of hypermedia links 12-1, 12-2, 12-3, etc., by employing user selected similarity threshold values which will be discussed below in more details.

In order to carry out the automatic link generation function as described above, a link generating system ,i.e., the HieNet link generator is developed. The HieNet system includes several primary modules to carry out several functions. The first primary functional module is a preprocessing module to preprocess a document. The following processes are performed on a document during a preprocess functional step to prepare a document node for automatic link generation according to the present invention.

a) Term Elimination

All terms in the document which are included in a stop-word list, e.g., "the", "and", "or", "etc.", etc. are eliminated and excluded from being processed in the link generation process. A user can modify the stop-word list by supplying a different stop-word list.

b) Term Frequency Calculation

The term frequencies of the remaining terms are counted and the final total number of occurrence for each term is kept in a separate record.

c) Vector Term Selection

A default number of terms, e.g., one-hundred terms, with their term frequencies closest to the median term frequency are selected for use as a term vector of the document.

d) Vector Term Weight Calculation

A weight calculation is performed for each vector term is by applying a post-order, i.e., a bottom-up, traversal of the document tree. By applying a post-order traversal of the document tree, i.e., a bottom up sequence along the tree, a very efficient weight computation is carried out since the computations are performed only for the leaf nodes on the document tree. Non-leaf nodes receive the weight credits from each of their leaf nodes. Lower level nodes therefore propagate weights upward along the hierarchical document tree. More details for calculating the vector term weights are described below.

e) Size Calculation

In the same step, the node size, i.e., the total number of words, are calculated. Again, only leaf nodes require the side calculation, since the sizes of the non-leaf nodes can simply be obtained by summing up the sizes for each of their children.

A second functional module is an automatic link generation module. A link is created on a node in the document tree if and only if none of its children nodes have links already been generated. The HieNet link generator applies a pre-order, i.e., a top down order, tree traversal to create a link on a node that is as small as possible. Only when an attempt fails, then the link generator processes links for a larger size node. It is for the purpose to allow a user to identify the smallest possible nodes during the generation of links such that a user only has to deal with smallest mount of data for relevant information. Under the circumstances that a user desires to see links for larger bodies of texts, HieNet link generator provides a slider bar for controlling the node size for link generation as that shown in FIG. 6C for a "Control Panel for Automatic Link Generation".

A third functional module is a user controlled dynamic link generation module. HieNet provides two slider bars in this module. The first slider bar is for the user to control the node similarity threshold and the second slider bar is for controlling the node size. Again please refer to FIG. 6C for the Control Panel for Automatic Link Generation. By default, HieNet generates a link with a pair of smallest nodes that satisfies both the similarity threshold and node size parameters. There is no fixed constrain on node granularity and depending on the threshold and node size, the node granularity can vary greatly. For example, the automatic generated links can be established from paragraphs to sections, chapters, books, or vice versa.

HieNet checks if the current node has a similarity measure above the threshold. Only then does it traverse to the descendants of that node; otherwise the sub-tree of that node is ignored completely. Since all the relevant information in that branch for all the nodes below have already propagated their term weights upward to each of the parent nodes, once a document node is determined to have relevant data below a threshold value, all the nodes in the branches below can be skipped without losing links that would have satisfied the similarity threshold. After a node is determined that a similarity threshold is satisfied, the node size is checked to determine if an automatic link should be generated.

With this intelligent pruning heuristics, the time complexity required for generating links is drastically lowered than the prior art methods which is typically in the order of O(n). Thus, the user is able to interactively change these parameters and obtains an expeditious response of dynamically created links. The highly interactive nature of these user requests and automatic generated links makes the approach practically useful. The quality of the system generated links based on lexical co-occurrence is fundamentally limited by the range and consistency of words used by the document authors. Users need some trial-and-error to adjust the linking parameters so that the system will create reasonable links without also creating too many remotely relevant associations between large amount of documents searched.

Figure 2:
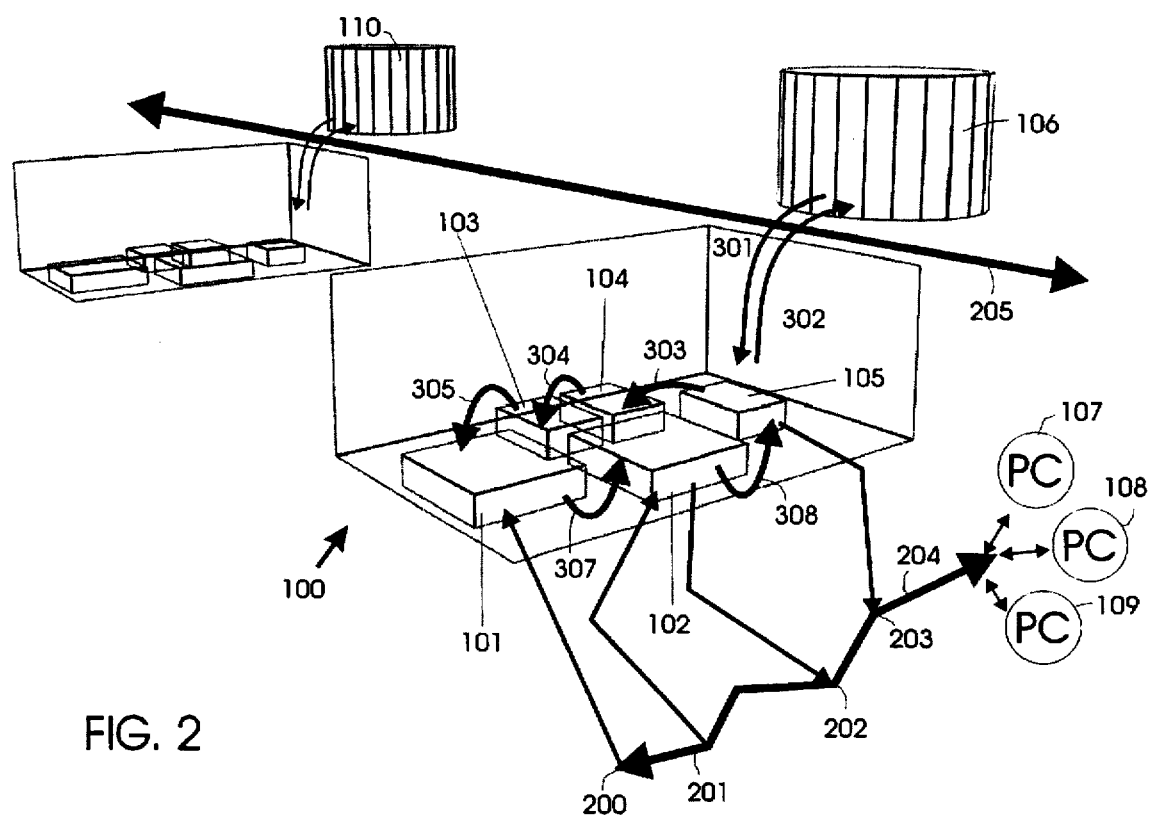
FIG. 2 is a functional block diagram of an automatic link generator of the present invention.

Please refer to FIG. 2 for the major components of a hypermedia link management system and the functions performed by these major components for the automatic link management and generation processes. For the very first time all hypermedia documents are retrieved from the hypermedia database 106 by the I/O controller 105 of the hypermedia link management system 100 through the network connection 301. These documents are processed and indexed by the preprocessing module as described above. After this one-time process, the indexes including the term vectors, term frequencies, node size and all relevant information relating to the documents for document search and link generation are stored in an associated document record. This is a one-time process and only the brand new hypermedia documents are required to be pre-processed. For link generation, the hypermedia documents are down loaded through an internal bus 303 to a structure reader 104. The hypermedia document is decomposed by the structure reader 104 into document nodes, i.e., hierarchical data objects according to a document tree structure as that shown in FIG. 4. Then the indexer applies various indexing methods to create indexing information for different kinds of hypermedia objects and nodes, such as indexes for graphics data, audio data, or textual data. The link generator 101 then selects discriminating terms based on term frequencies or other term selection criteria as that exemplified in FIG. 5. A term vector consists of these discriminating terms are computed for every node of each of the document tree. Each entry in the vector represents the weight for a discriminator. For each node or object, the term vector is calculated by calculating a term weigh per entry in the term vector. Leaf nodes are calculated first and the weights are propagated bottom up to a parent node. The resulting term vector is then stored for each node as a separate record.

After the hypermedia documents are retrieved by the I/O controller 105, these documents are sent to the personal computers (PC), e.g., PC 107 to 109, via internal bus 203 and local area network 204. The hypermedia documents are displayed on user's computer screen as that shown in FIG. 6A and FIG. 9.

The major thrust of the present invention is to provide a link generator 101 which generates new links automatically based on existing user-created links. The process starts with a user selects a source node from a hypermedia document as that shown in FIG. 6B, and then the user selects a second document node as a destination node as shown in FIG. 6C. Once the source node and destination nodes are selected, a user created node, e.g., link 17 as that shown in FIG. 1, is generated by the links generator 101 (please referring to FIG. 6D). A user is provided with the flexibility to create a link across the network into other remote hypermedia management system 110 via connection 302 and Internet 205. Connection 302 to the Internet system 205 allows the links to be created across the network and also allows the links to be shared and distributed across the networks.

The user created link 17 is transferred from user's PC, e.g., PC 107 to 109, to the link manager 102 via the connection wire 201. The link manger 102 calculates the link profile for the user created link and stores the results in an internal cache. The link profile contains information such as date, link types, e.g., graphics, textual, audio, etc., and identifications, unique addresses and term vectors of the nodes. Please referring to FIG. 6E for an example of link profile for a user created link, e.g., link 17 in FIG. 1. The link generator 101 the employs The link profile generated by the link manager 102 is transferred to the link generator 101 via a data bus cable 306. The link generator 101 the employs the link profile and the indexing information from the hypermedia data base 106 to start an automatic link generation process as that shown in FIG. 6F. All the pairs of documents nodes in the hypermedia database 106 which have similarity between them that matches the similarity threshold are selected as source and destination nodes and an automatic system generated link is constructed. The similarity between two document nodes is calculated by taking the inner product of their corresponding term vectors. By default, the link generator 101 tries to link with smallest possible pair of source and destination nodes. All system generated links are transferred back to the link manager 102 and stored in the link cache via data bus 307. The resulting links generated by the link generator 101 are also displayed in a user's computer 107 to 109 as that shown in FIG. 7.

A user is provided with the option to open the links by clicking on the link icons. The user's requests to open and review the links are sent to the link manager 102 and the contents of the links are sent to each computer 107 to 109 via data bus 202 and 204. After a user reviews the contents of the links, a user may then adjust the link generation, such as similarity threshold and node size. The user changes of the link generation parameters can be entered through the control panel as that shown in FIGS. 8 and 9. The link generator 101 then interactively generates new sets of links according to new link parameters provided by the user as that shown in FIG. 9. Table 1, on the last page of the specification, summaries the functions performed by each of the functional blocks shown in FIG. 2.

Figure 3:
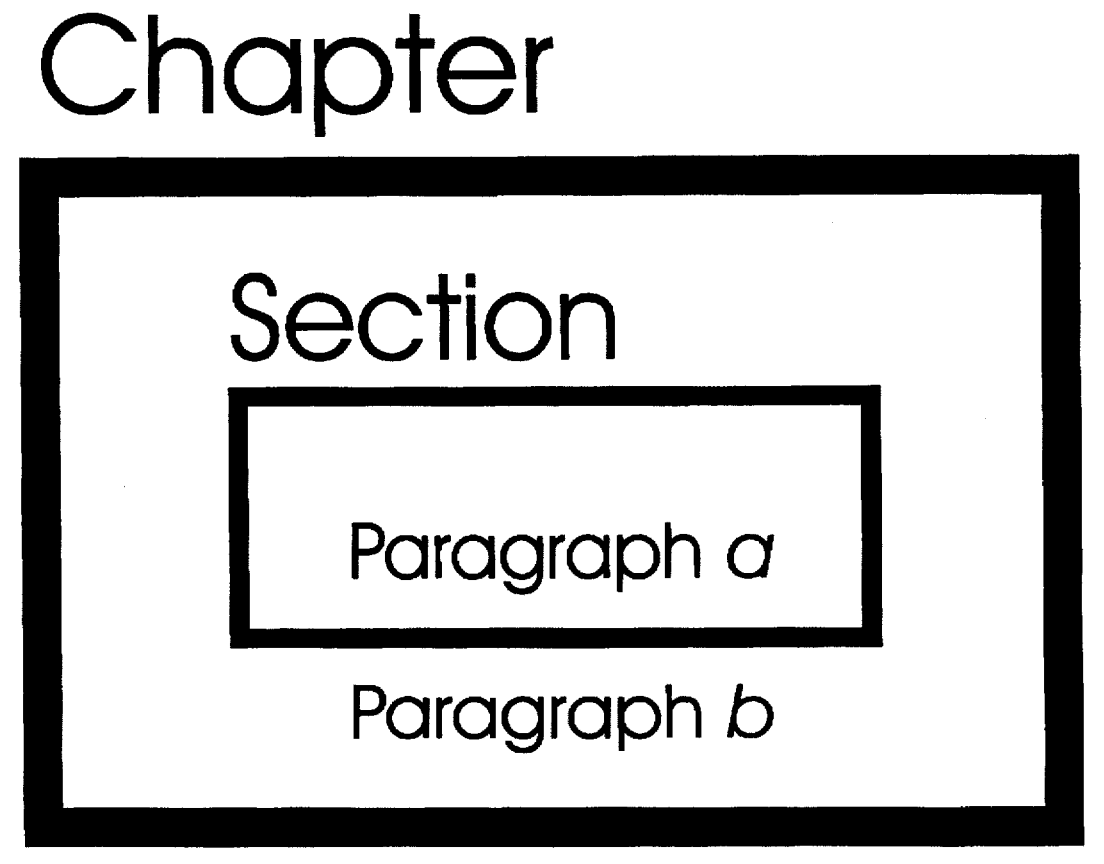
Figure 4:
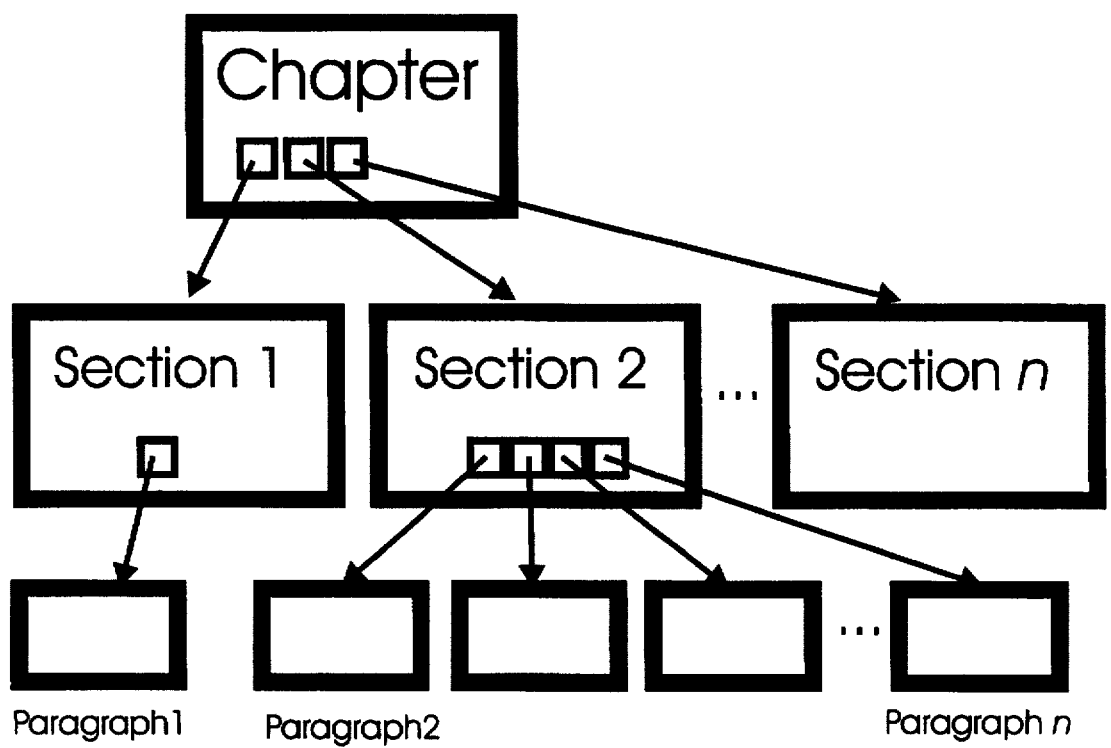
FIG. 4 shows the hierarchical tree structure of the hypermedia document.

Referring to FIG. 3 for the structure of a hypermedia document. A hypermedia document can be decomposed into a plurality of objects or nodes. The document node, e.g., a chapter, as shown in FIG. 3 includes five objects which are "chapter", "section", "paragraph a" and "paragraph b". The actual text are omitted for the purpose of simplicity of illustration. FIG. 4 shows the tree-type hierarchical structure of a objects or nodes. The hierarchical tree structure consists of objects or nodes of different sizes thus constituting a hypermedia document. One particular advantage of the present invention is that the automatically generated links can link nodes of different granularity, i.e., the links can be between two nodes of every kinds of objects, e.g., a book-to-a paragraph, a chapter to a section etc. Unlike the restrictions in some of the prior art systems where the nodes are limited to simple text chunks. The text objects of the present invention are provided with unique identification (ID) and other attributes thus greatly increasing the flexibility in linking nodes of different granularity.

Referring to FIG. 5, the indexer 103 as shown in FIG. 2 selects the discriminating terms based on the frequencies of these terms. The terms with high frequencies of occurrence represent discriminating features of the document. The discriminating terms as shown in FIG. 5 are selected from 16,000 words. In this example, seven articles relating to Los Angeles riots are transcribed from Newsweek and Time Magazines. Two chapters of object-oriented (OO) C++ graphics manuals are intermingled with these seven articles. In FIG. 5, the top four terms are color, model, black and value. These terms are commonly used in these articles.

Figure 6A:
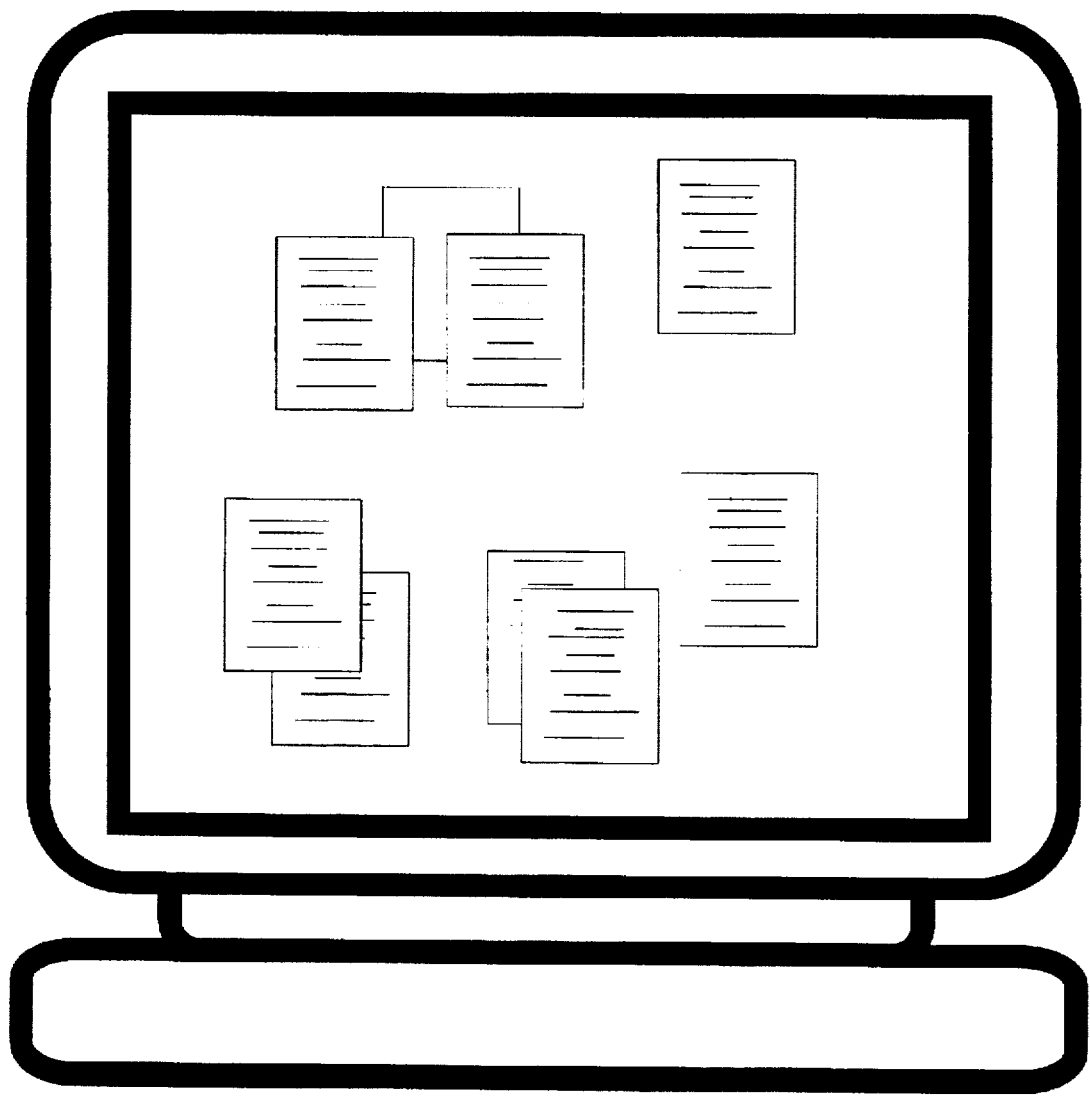
FIG. 6A shows a hyper media display.
Figure 6B:
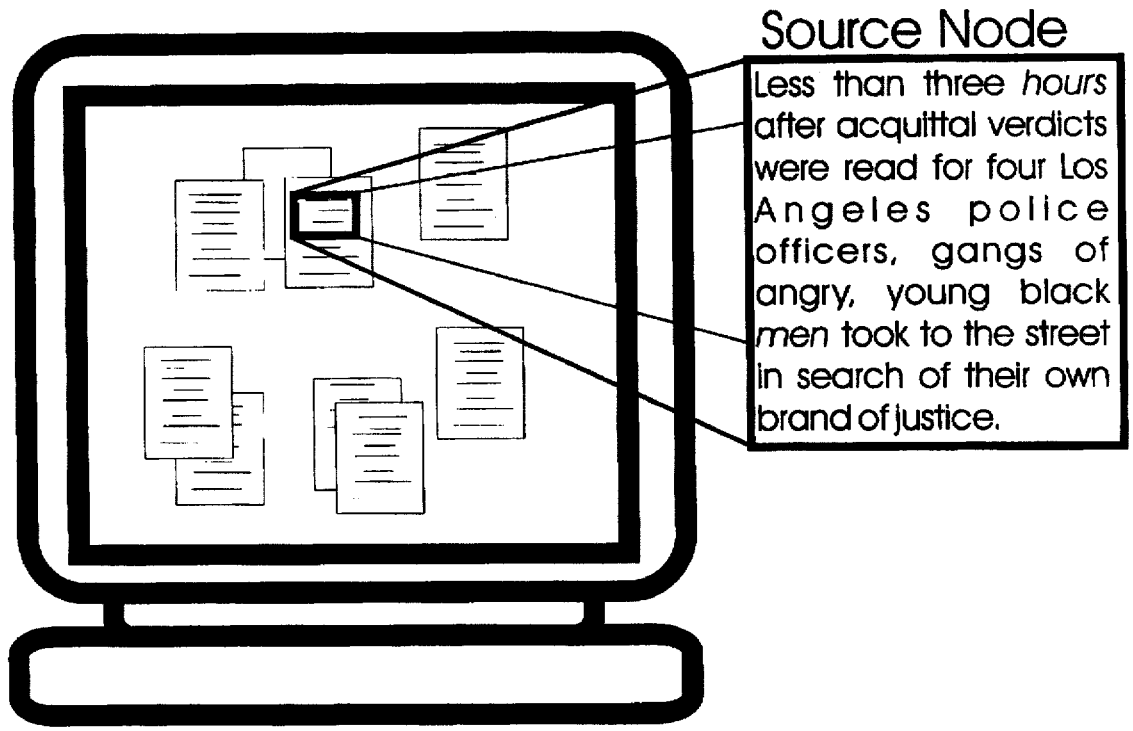
FIG. 6B shows a link creation process.
Figure 6C:
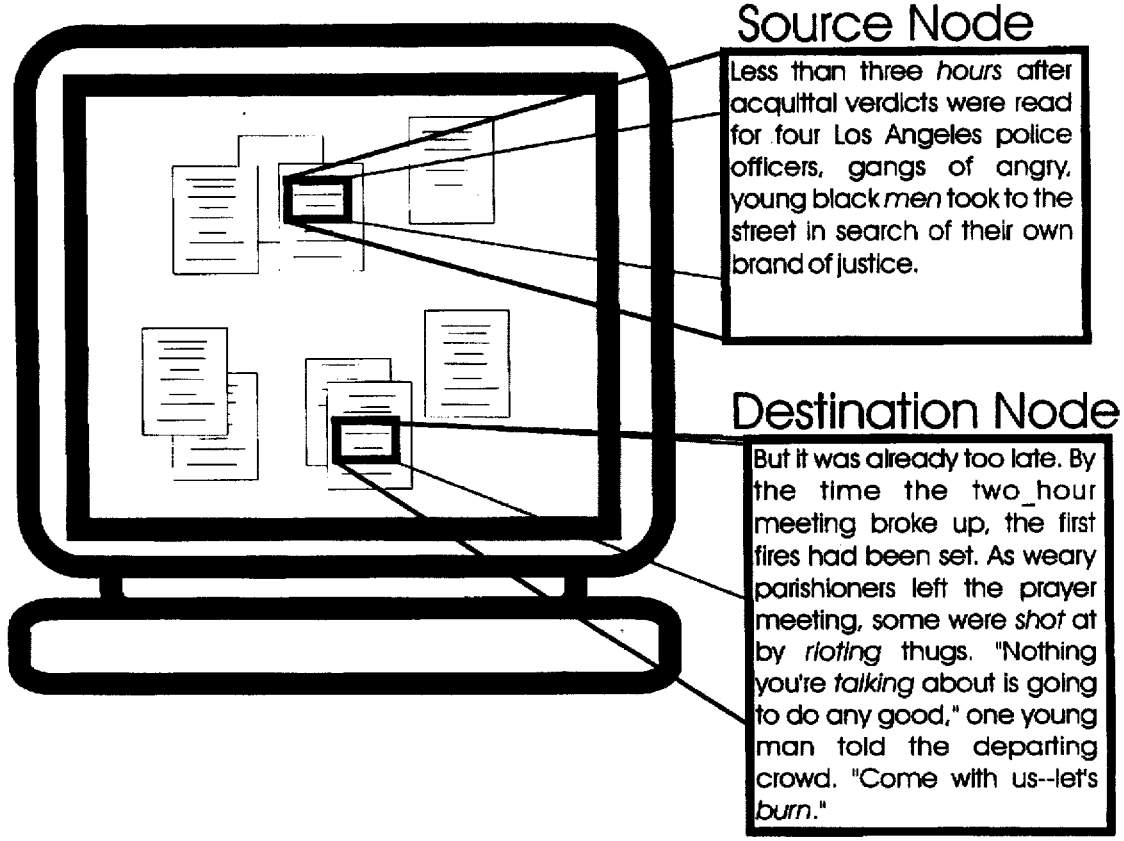
FIG. 6C shows the process that a user continues the linking process.
Figure 6D:
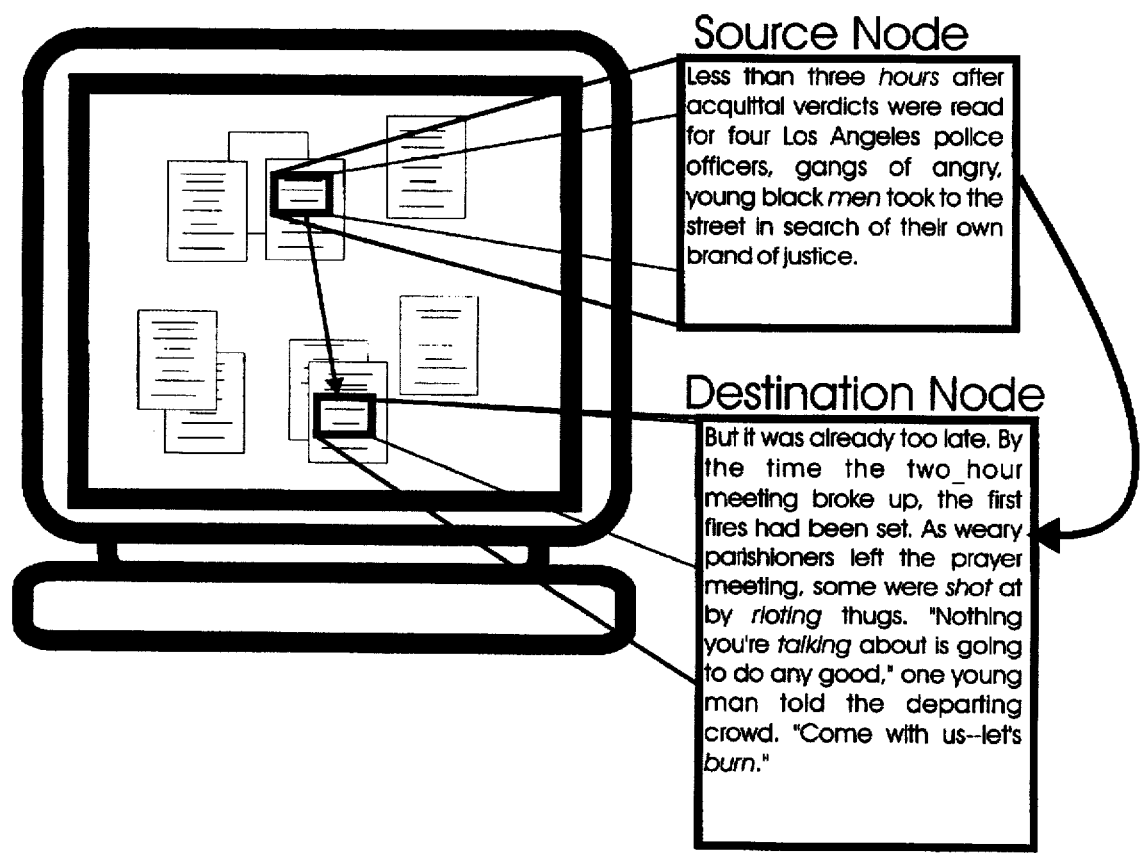
FIG. 6D shows the completed node connection between a source to a destination node.
Figure 6E:
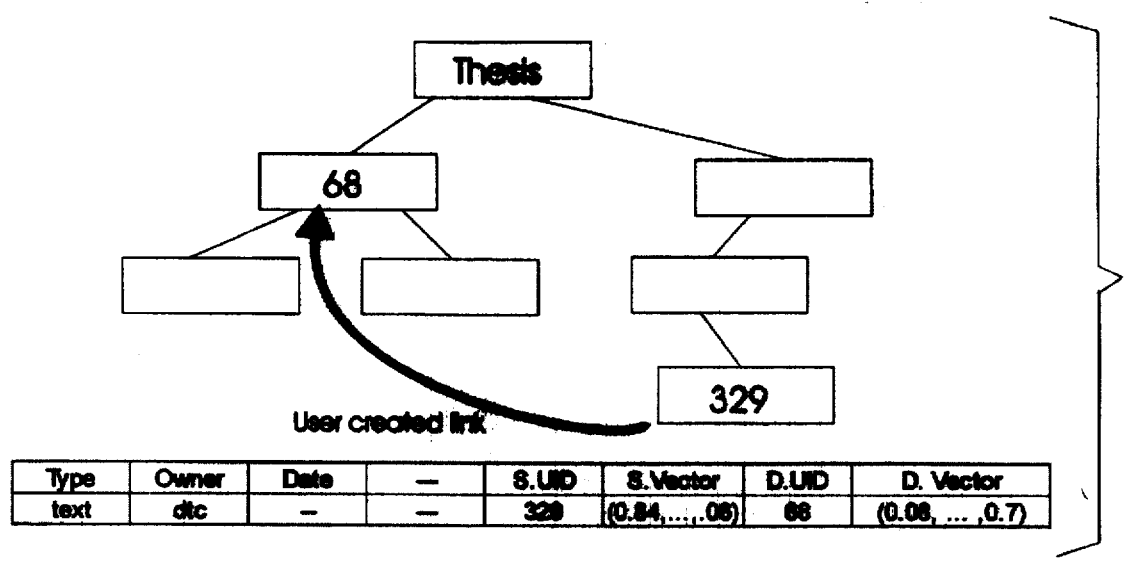
FIG. 6E the functions performed by a link manager.

In FIG. 6A hypermedia documents are displayed on a computer screen to provide to a user a visual representation of the documents available through the network system. With these documents accessible to a user, selection is made in FIG. 6B where a user identifies a source document. In this example, the user selects an source node which includes discriminating terms such as "hours", "men", and "street". Then in FIG. 6C, a user selects a destination node for establishing a link between the source node and the destination node. In this example, the article selected by the user includes discriminating terms of "rioting", and "talking" shown as part of the textual content in this destination node. Upon a user's command, a user created link is established as that shown in FIG. 6D thus linking the source node to the destination node. For this user created link, the link manager 102 then calculates the link profile. As shown in FIG. 6E the link profile is a table includes the link creation date, the link owner, the link type, identification, unique addresses and the term vectors. The definitions of the term vectors will be further described below.

Figure 6F:
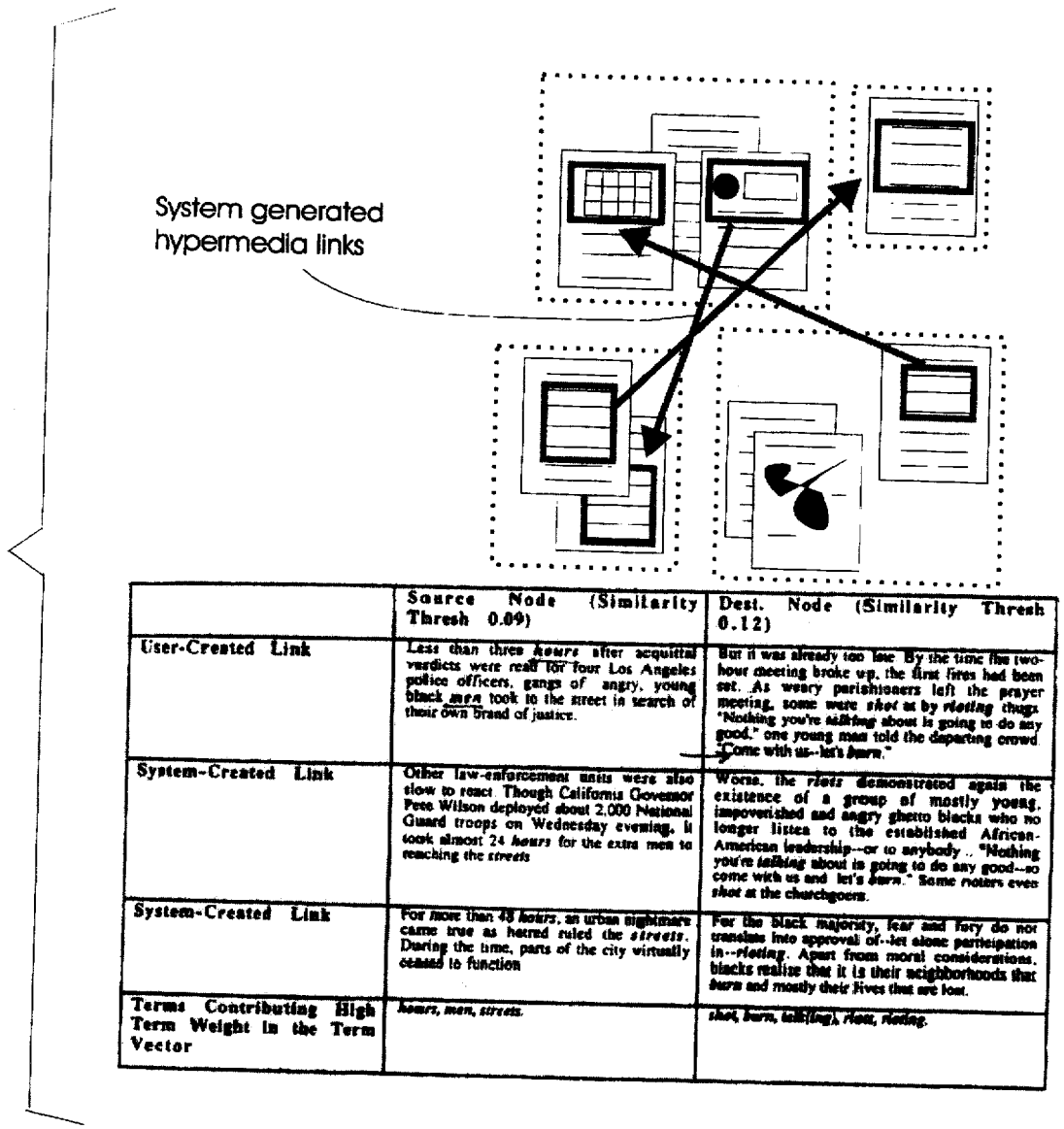
FIG. 6F shows the pictorial view of link generation processes.
Figure 7:
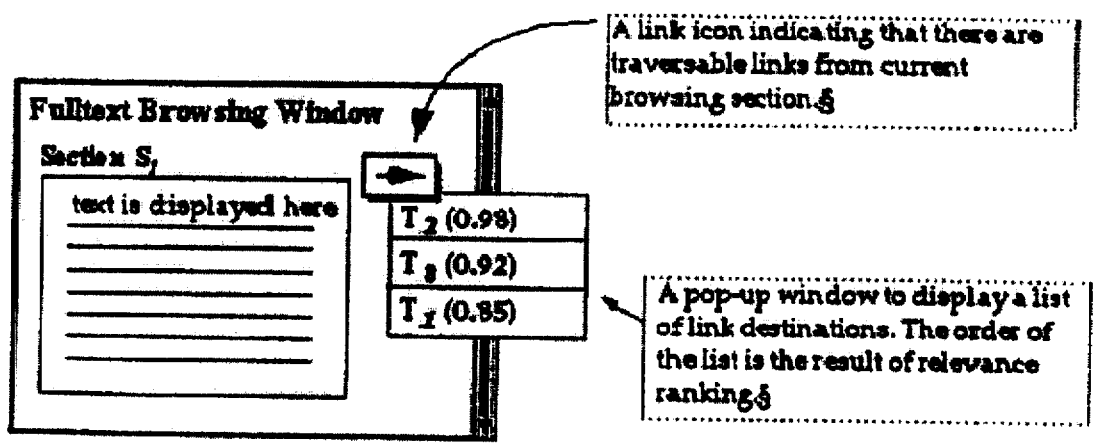
FIG. 7 shows an icon of a hypermedia display.
Figure 8:
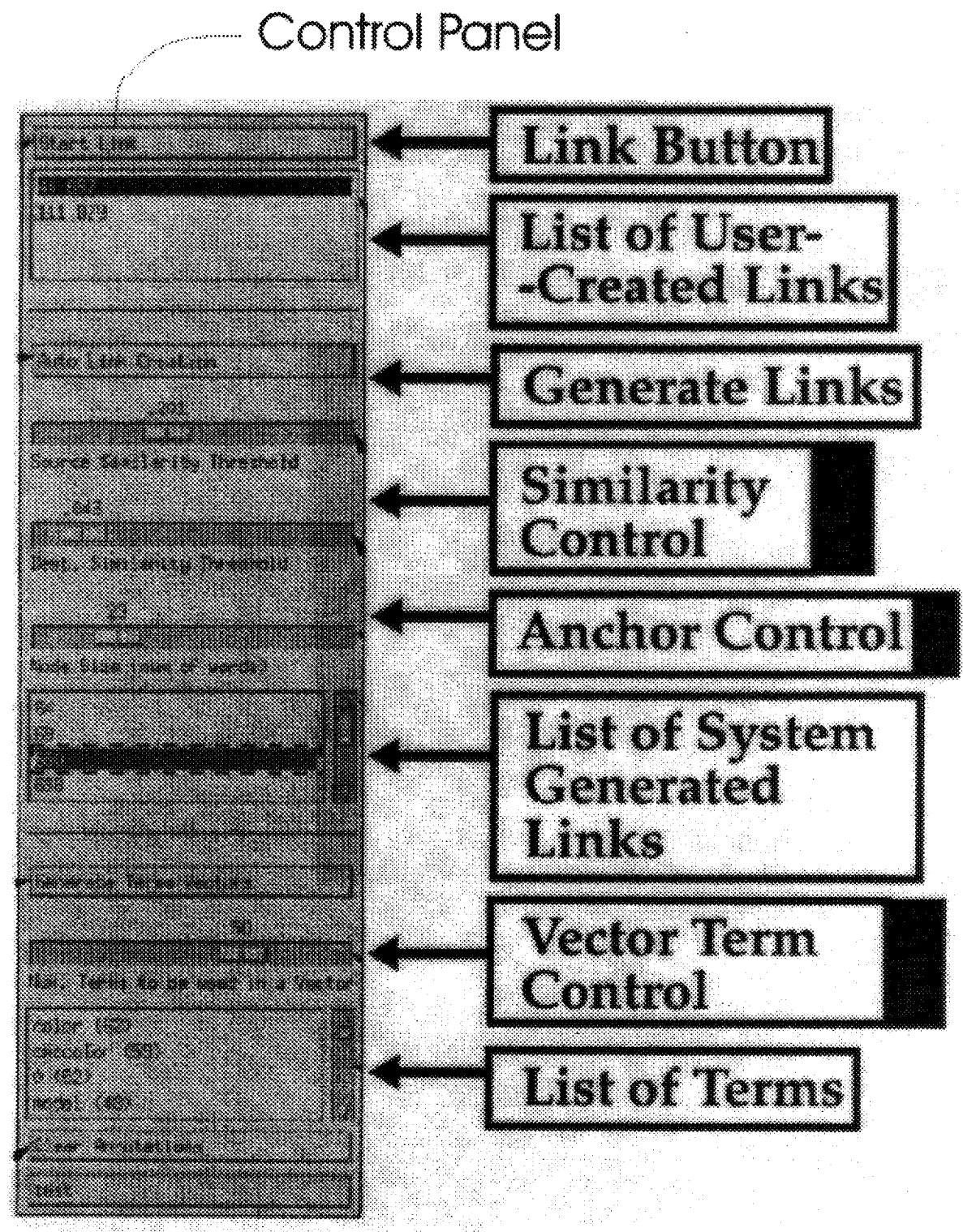
FIG. 8 shows a control panel for link modification.
Figure 9:
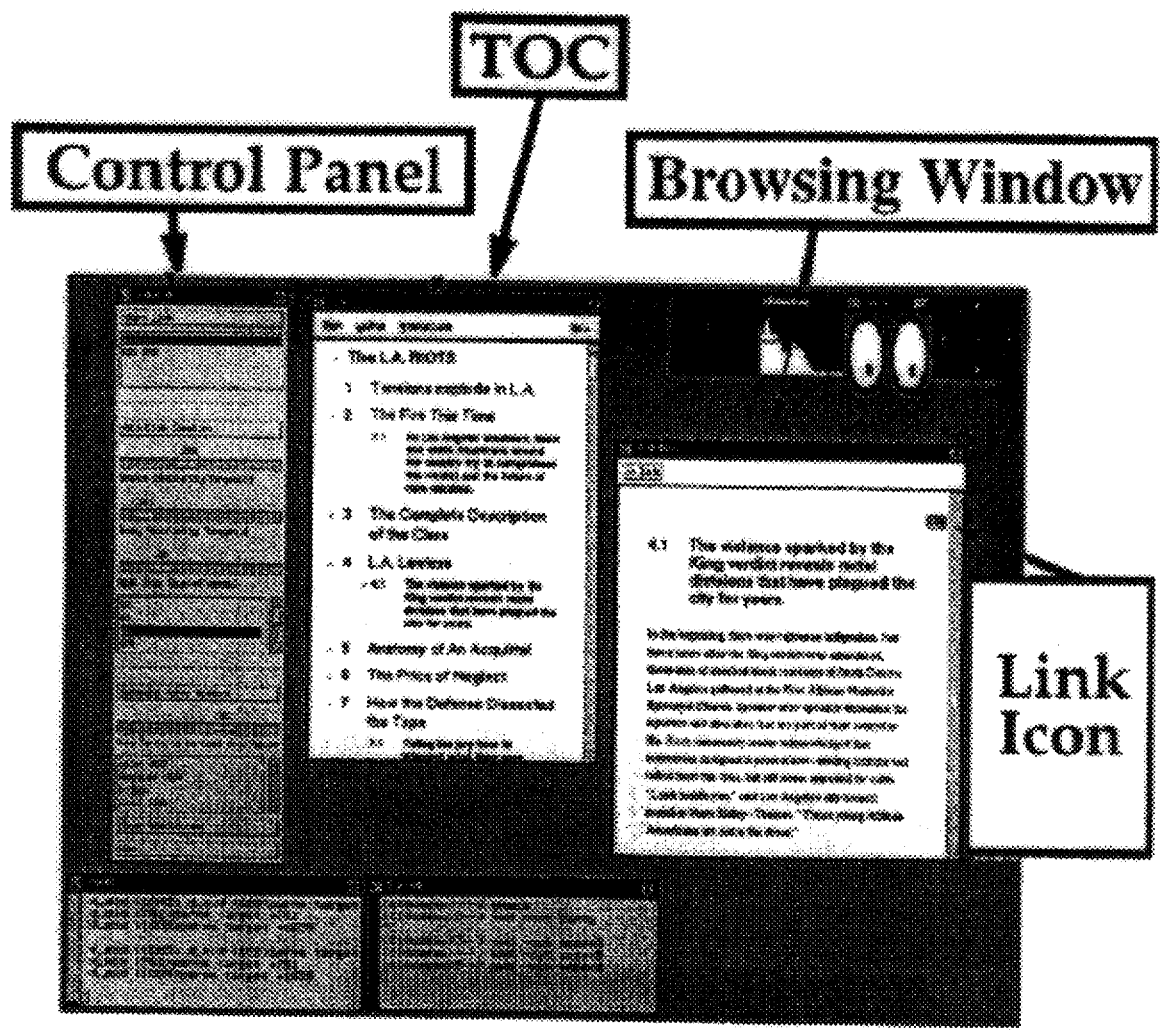
FIG. 9 shows an the control panel provided to the user interface.

With this user created link and the link profile as that shown in FIG. 6E, a plurality of system generated links linking a plurality of pairs of source-and-destination nodes which satisfy the similarity threshold Criterion and the node size requirement, are established as shown in FIG. 6F. According to the table shown in FIG. 6F, two system generated links are established to link two pairs of source and destination nodes. The terms which contribute to high term weights in the term vector for linking these two pairs among these articles are "hour", "men", and "street" for the source node, and "shot", "burn", "talking", "riot", and "rioting". A screen display is shown in FIG. 7 as an example of the system generated links. A special icon "→" is shown to indicate that there are system generated links established and a pop-up window is used to display that a list of link destination. The order of the list is based on the result of relevance ranking calculated with term vector weights as explained below. The link manager 102 and link generator 101 also provide a control panel as shown in FIG. 8 for a user to control the link generation process and to adjust the link generation parameters such as the node size and the similarity threshold. FIG. 9 shows an exemplary search results displayed on a user's computer monitor. In addition to the control panel, the system generated links including two hypermedia documents and associated link profile parameters are also shown in this display. A user is provided with a comprehensive graphic interface to perform the document search and linking processes.

According to the present invention, when a user entered a data retrieval request by entering a source node linking to a destination node, and link instructions, the automatic link generator make use of the user created links to generate a user preferred 'link profile'. The Link Profile is analogous to the fisherman's net that catches fish in the water. Depending on the type or size of the networked system, different fishes, i.e., documented data, are caught and retrieved. Similarly, the link generator in the invention builds a 'information agent' that applies the Link Profile to catch relevant information and bring it back to a user's personal information space. The user can create Link profiles for any given occasion. For example, a user may create a new Link Profile which is used in an art class and save the Link Profile for other art-related hypertext documents. The user may also load any Link Profile as a model profile and generates new Link Profile based on the information and indices contained in the model profile.

A running model can be built on a hypermedia document structure where the test representation is based on the Standard Generalized Markup Language (SGML) which is becoming a popular document exchange format and hyper-document structure. Many popular tools and system functions are now available on the market. Therefore, this invention can implemented as efficient and practical procedures on a system which includes documents in commonly used SGML format. A running model of this invention is built on top of a version of DynaText which is used in Brown University. The details of DynaText features are described in 'HieNet: A User Centered Approach for Automatic Link Generation' (Hypertext 93 Proceedings, November 93 PP. 145–158 by Daniel T. Chang). The information included in that paper is incorporated by reference.

As FIGS. 2 to 9 are provided for illustrating the processes performed by the link generator 101 and link manager 102. The details of content representations of each node by attributes and the calculation by the use of Salton's Vector Space Model are fully described below and can be easily referenced to an article by the present Applicant which is incorporated as reference herein and attached as part of the Application. The details of link profile vector and similarity threshold computations and evaluations are also described below to fully disclose the novelty of the present invention.

As one can appreciate that most hypertext systems facilitate one-at-a-time link creation, but only few support automatic link generation. In systems that support automatic link generation, user interests are either ignored or explicit user actions are required to enter a set of keyword and queries. In this invention, a hypermedia link management system is disclosed wherein automatic system generated links are "calculated" and then linked based on a previous created user-links. A user is allowed to control the system generated links by providing similarity thresholds, node granularity and the extent of linking in composite nodes. The term vectors derived from Salton's Space Model are applied for similarity computations. By applying an existing user created link as a basis for similarity computations and threshold evaluation, the hypermedia link management system disclosed in this invention provides automatic system generated links which most closely and adaptively reflect the user experience containing in the user link presented to the link management system.

For a basic understanding of the extent of the invention, the definition of a "node" is broadened to include any structured text object. Unlike the nodes in some systems which are limited to simple text chunks, the text object can contain other objects and it has an unique D and other quantifiable attributes associated with each text object. For example, a text object Chapter can contain several paragraph objects and section objects. The section object, in turn, may contain other objects. By applying the Standard Generalized Markup Language (SGML) as the text representation of the hyper-document structure, no restriction is placed on the node, i.e., text object, granularity. The granularity is a parameterized variable that the use may specify with great deal of flexibility. In SGML structure, a hyper-document is constructed with a tree hierarchy and when a document is managed with a tree structure, the automatic linking process can be performed with a very efficient and practical manner.

An executable program, i.e., HieNet, is built according to the principle of this invention. HieNet is built on top of a version of DynaText used in research at Brown University. DynaText is a hypertext browser of the Electronic Book Technologies, Inc. The DynaText graphical browser consists of a table of contents (TOC), a M-text window for displaying the text and a full text structure based query facility. Dyna-Text requires that a document to be in SGML structure in order to index and format the document as an on-line hypertext. A document is typically marked up in SGML by employing a plurality of "tags" to delineate the structure as chapter, section, subsection, etc. By the use of these tags, DynaText extracts the hierarchical structure to form a tree. A collection of document trees forms a document space. When a user link is provided to the link generator, DynaText extracts and display the elemental attributes of the user generated link. For example, the element
<video num=234> This is a text description of an emergency procedure <video>
specifies a link that originates from this text element to video clip number 234 stored in the database. SGML element tags can be used to indicate the link types by specifying them as values of a link type attribute. Hence, user can view desired links via attribute filters. The structures of the document can also be used as filters. For example, the use can ask, "show me all the video links (links to a piece of video) contained in chapter 2".

The HieNet Link Database

Most research hypertext systems and a few commercial ones store links separately in a database where each link is a record entry in a link table. Several fields/attributes are associated with a link such as address for the source and destination node, link type, link owner and link date. However, no information is generally stored in the link table to describe the content of the nodes.

The version of DynaText on which HieNet is built on still lacks a link database and associated Link manager. A database is first built which is now part of the commercial DynaText product. In addition to the typical link attributes as generally included in a typical system, HieNet adds extra attributes to store the content representation of the link's source and destination nodes as text objects. The content representation now stored by HieNet together with other attributes are employed to define a link profile. A content description for each node is further calculated as a vector by using a Salton Vector Space Model.

Salton's Vector Model

Representing Node Content as a Vector

Give a text node Di, a content representation may be given as a term vector of terms $Di=(d_{i1}, d_{i2}, \ldots, d_{it})$, in which dik represents a term weight of term Tk assigned to node Di. The weight of each term dik is calculated using the heuristic term weight equation which is the term frequency divided by the document frequency, i.e., $d_{ik}=tf/df$, that assigns high term weights to terms that occur frequently inside a particular node but relatively rarely in the document space L. Note that $dik^2 1$ since the term frequency, the number of times the term occurs in a document, is at most equal to document frequency, i.e., the number of times the term occurs in the document. Terms with a high term weight known to be important in content identification. Terms occurring with extremely high frequency in the document space turn out to have a very small term weights because their document frequency is extremely high.

Similarity Measure

Given two nodes Di and Dj, a similarity measure can be obtained between items based on the similarity between the corresponding term vectors. The similarity measure can be defined and computed as an inner vector product as:

$$sim(Di, Dj) = \sum_{k=1}^{t} d_{ik} d_{jk} \qquad (1)$$

Updating the Link Profile

Every time the user creates a link, a link instance is added to the Link Profile. This Link Profile records the creator, creation time and link type attributes and most importantly, a pair of term vectors, one for source node and one for the destination node.

HieNet preprocesses the document and composes a term vector for each of the leaf nodes in the tree. The term vector represents the content for each node. In addition, whenever the user creates a link, HieNet uses the term-weight equation, which as defined above as the term frequency divided by the document frequency, i.e., $d_{ik}=tf/df$, to compose two term vectors, one for the source node and one for the destination node and store them in the Link Profile (please refer to FIG. 6E which illustrates graphically a Link Profile).

Automatic Link Generation Based on the Link Profile

Using the similarity measure equation as that defined in Equation (1), HieNet scans the document space to fine node pairs whose similarity measure matches with the user created links in the Link-Profile. First, any node whose similarity measure with the source vector in the Link Profile is above a certain threshold is put into the source set S. Secondly, the same operation is applied to generate the destination set T. Finally, HieNet creates links between the sets S and T (please refer to FIG. 6F for system generated links).

Automatic Link Generation Based on Node Size

In addition to the similarity threshold, HieNet also takes the node size into consideration. By default, HieNet creates a link with the smallest pair of source and destination nodes that surpass the similarity threshold. A link that is relevant to the user may amount to only two paragraphs in a 400 page document. This is a desirable characteristic which is called the sub-document retrieval capability. However, the user is able to overwrite the default by setting a new node size value for the system generated links in linking these nodes.

Relevance Ranking

Each destination node in the link is assigned a source calculated from the similarity Equation (1). After the system completes the generation of the automatic link, a source node may contain more than one link to various destination nodes. The user is presented with a list of ordered destination nodes with the highest similarity measure displayed on the top of the list with additional nodes arranged in accordance with a relevance ranking order (please refer to FIG. 7 for a browsing window showing such an operation).

User Controlled Parameters

1. Stop-word List

The user can provide to HieNet a list of words to be eliminated at the start of the link generation process. This process is useful in eliminating function words such as "and", "or", and "not" or any other words that occur extremely frequently in the document space ant thus are poor content discriminators because their term weights are extremely small.

2. Vector Term Selection

As a default, HieNet selects a group of terms whose term frequencies are closest to the median term frequency in the document space. Terms with extremely high or low frequency are not selected since their term weights are dose to zero and they are ineffective in the similarity measure calculations. Better term selection generates more relevant links for the user.

3. Link Filter

The user can apply filters to minimize links known to be irrelevant or undesirable as link examples and use the remaining links to generate new links. For example, the user can filter out links created before a certain date or by a certain person, since all the links created in the system have time and creator attributes attached to them.

4. Node (Text Object) Size

The user can adjust the size parameter to view links that contain nodes of a certain size.

5. Similarity Threshold

An interesting consequence of the link generation method of this invention is that when the similarity increases above a certain level the system starts to generating links with larger node size. The reason is that when the size of the nodes becomes larger, the node contains more words and the term frequencies of these words are increased. High term weights are calculated with higher term frequencies which leads to higher similarity measure (please refer to FIG. 8 for the display of a control panel showing the automatic link generation process).

Steps Performed by HieNet in Automatic Link Generation

The steps carried by HieNet in performing an automatic link generation process are described below:

Preprocessing

1. Term Elimination

All terms in the document space specified in the stop word list are excluded from the link generation process. The user is provided with an option to modify the stop word list or to supply a new list, 2. Term Frequency Calculations The term frequencies of the remaining terms are determined based on a numerical counts of the times a term occurred in the document space.

3. Vector Term Selection

A default number of terms, e.g., 100, for which the occurrence frequencies are closest to the median term frequency are selected for use in the term vector. The user can select different terms.

4. Vector Term Weight Calculation (Post Order Traversal of the Document Tree)

By taking advantage of the hierarchical tree structure of the document space, a post order traversal of the document tree, i.e., a bottom-up, sequence is applied to calculate the term vectors only for the leaf nodes in a document tree. Non-leaf node then obtain the term weight from the credit of the descendant nodes. Thus the term vectors are propagated upwardly in the document space.

The process in computing the term vector is different from a usual card-based link generation system. In a card-based link generation system, the link is only generated between two nodes only if the two nodes by themselves can come up with a similarity measure exceeding a threshold. If the potential link does not pass the similarity threshold, no link is created and the knowledge that a Link had a partial support is discarded. In contrast, in HieNet of this invention, the term vectors are propagated and credited upwardly from lower nodes to their parents. Higher level nodes may accumulate sufficient term frequency to trigger a link generation. Since the term vector computations are carried out only for the leaf nodes, the worst time complexity for term vector calculation is O(n) which is not worse than the time required to index each chunk in a card-based link generation system.

5. Size Calculation (Post-Order Traversal of the Document Tree)

In the same step in calculating the term vector, the node size, i.e., the number of words are also determined. The size for a non-leaf node can be obtained by simply slimming up the sizes of the descendant leaf nodes.

Automatic Link Generation Based on the Link Profile

A link is created on a node in the document tree if and only if none of its children have links created. HieNet applies pre-order (top-down) tree traversal to create a link on a node that is as small as possible. Only when this attempt fails, then the link manager considers links on a larger section. This heuristic rule is employed because the user is most likely to be interested in reading links that connect sections containing the fewest words, such as a paragraphs in conducting a document search on the networked databases. In the case when a user desire to examine a larger body of text, a user option is provided by the use of slide bar for controlling the node size in establishing the links.

Dynamic Link Generation Based on User Controllable Parameters

HieNet provides two slider bars; one for the user to control the node similarity threshold and the other for controlling the node size. By default, HieNet generates links between a Fair of smallest nodes that satisfies both the similarity threshold and the node size. The node granularity can be flexibly changed with limitations for document search in establishing the links. For example, the auto-generated links can vary from paragraphs to chapters, books to sections, or vice versa.

HieNet checks if the current node has a similarity measure above the threshold. Only then does it traverse to the descendants of that node. Otherwise, it ignores the sub-tree of that node completely. It is not likely that any relevant information is down in that branch of the document since all the descendent nodes had already sent the term weight upward. For example, if a chapter level node still does not has a sufficient weight to pass the similarity test, then it will be futile to check for any of its descendent nodes. After a node passes the similarity test, it is checked to determine if it has a right size according to a user input requirement.

Because of the "tree pruning" heuristics, the time complexity for generating links is drastically lower than O(n). Thus the user is able to interactively change these parameters and obtain an instantaneous response of dynamically created links. The high degree of interactivity is what make this approach practical. The quality for the system generated links based on lexical co-occurrence is fundamentally limited by the range and consistency of words used by the documents. Users generally require some trial and error attempts to adjust the linking parameters to generate a reasonable link and to eliminate the irrelevant links. The link management system must provide a system that the user can interactively perform the link and search for the system to be practically useful.

An empirical test of HieNet is applied to two set of textual documents with very different content but with many specific terms in common. Specifically, seven articles related to the Los Angeles riots from Newsweek and Time Magazines in SGML format are intermingled with two chapters of an object oriented C++ graphic package manual. Words like color, model, value, and class have very high frequencies in both text bodies. The sample documents consist of about 16,000 words. FIG. 5 shows the words extracted by HieNet in processing the text. The system generated links by HieNet only links the articles related to either to the Los Angeles Riot or the O—O manuals but no links between them. FIG. 6F also shows that useful and meaning links are generated by HieNet As shown in FIG. 6F, the first link is a user generated link while the second and the third links are system generated links based on the user profile presented to HieNet through the user generated link. From the second and the third links, when compared to the first link, i.e., the user generated link, it is quite obvious that the user interest in discussing the timing and rapid-spreading of the Los Angeles riot are fully taken into consideration when HieNet is executed to provide the system generated links.

Although the present invention has been described in terms of the presently preferred embodiment, it is to be understood that such disclosure is not to be interpreted as limiting. Various alternations and modifications will no doubt become apparent to those ski/led in the art after reading the above disclosure. Accordingly, it is intended that the appended claims be interpreted as covering all alternations and modifications as fall within the true spirit and scope of the invention.

TABLE 1

| Component No. | Name and Functions Performed |
|---|---|
| 100 | Hypermedia link management system |
| 101 | Link Generator-generates new hypermedia links automatically based on user created links |
| 102 | Link manager - calculates a link profile per user created link & stores both user created and link generator created links |
| 103 | Indexer-Creates index information for hypermedia documents |
| 104 | Structure reader- decomposes hypermedia documents into objects and setup structure tree |
| 105 | I/O controller-controls data input and output |
| 106 | Hypermedia database-stores hypermedia documents |
| 107–109 | Computers or workstations |
| 110 | Remote hypermedia link management system on network |
| 200 | Link generation controller-controls link generation |
| 201 | Output port to Link manager- transfers user created link including the link profile to link manager |
| 202 | Input port to PC- transfers system generated links to PCs |

TABLE 1-continued

| Component No. | Name and Functions Performed |
|---|---|
| 203 | Content input port-transfers content of hypermedia content to PC users |
| 204 | Local area network-connects local PCs |
| 205 | Internet system- connects multiple remote systems |
| 301 | Data bus - transfers new documents to indexer |
| 302 | Data-bus - connects user to Internet systems |
| 303 | Data bus - sends data to structure reader |
| 304 | Data bus - sends structured documents to Indexer |
| 305–306 | Data bus -loads indexing data to link generator |
| 307 | Data bus -sends links to link manager |

I claim:

1. A data-handling system provided for operating in network systems each including a plurality of processor-database units each containing a plurality of structured hypermedia data objects retrievable by user via said network systems therefrom, said data-handling system comprising:

a user interface for a user to enter and modify a user input of a source data-object and a destination data-object thus allowing a user to provide intuitive-associations of two data-objects without requiring specific input of link-defining terms, and to enter a user designated similarity threshold;

an automatic link generator for receiving and processing said user input of said source data-object and said destination data-object for generating a system generated user-link-profile; and said automatic link generator further provided for applying said system generated user link profile and said similarity threshold to automatically generate a plurality of system generated links for linking a plurality of data-objects in said processor-database units conforming to said user designated similarity threshold whereby a plurality of system generated links can be generated based only on a user input of said source data-object and said destination data-object without requiring a user input of keywords or other link-defining terms.

2. The data-handling system of claim 1 wherein:

said automatic link generator further includes a term vector computing means for computing a plurality of user-link term vectors for quantifying said system generated user link profile for said user generated link; and said automatic link generator further includes a link-similarity computing means for applying said user-link term vectors to compute a link-similarity between every two of said plurality of processor-database units in order to automatically generate said plurality of system-generated links for linking a plurality of processor-database units conforming to said user designated similarity threshold whereby each of said system-generated links .being generated based on said user input of said source data-object and destination data-object without requiring a user input of keywords or other link-defining terms.

3. The data-handling system of claim 1 wherein:

said automatic link generator further provides said system-generated links to said user interface for said user to enter a new source data-object and a new destination data-object, and to enter a new user designated similarity threshold.

4. The data-handling system of claim 3 wherein:

said automatic link generator further includes a storage means for storing said user input of source data-object and destination data-object said similarity thresholds, said system generated user link profiles, said term vectors, and said system-generated links.

5. A link management system provided for logging-on by a plurality of data-users for linking said data-users to a plurality of indexed data-objects distributed among a plurality of hypermedia databases, said link management system comprising:

a link manager for receiving a similarity threshold and a user input of a first data-object and a second-data object in said hypermedia databases, said link manager includes a profile computing means for computing a user-link profile representing an association of said first data-object to said second data object;, said link manager further applying said user-link profile to compute a link-similarity between every two of said indexed data objects distributed among said data bases; and an automatic link generator for automatically generating a system-generated link between two of said indexed data objects when said link-similarity exceed said similarity threshold whereby a plurality of system generated links can be generated based only on a user input of said first data-object and said second data-object without requiring a user input of keywords or other link-defining terms.

6. The link management system of claim 5 wherein:

a plurality of said indexed data-objects, represented by $D\text{-}Obj^k(1)$, where $k=1, 2, 3, \ldots, L$ and L is a positive integer, wherein each includes $N^k$ levels of sub-data-objects, represented by $D\text{-}Obj^k(i)$, where $i=2, 3, \ldots N^k$ and $N^k$ is a positive integer, wherein $D\text{-}Obj^k(i)$ includes several $D\text{-}Obj^k(i+1)$; and said automatic link generator generating a system-generated link between two of said indexed data objects including any two of said $D\text{-}Obj^K(1)$ and said sub-data-objects $D\text{-}Obj^k(i)$ for $k=1, 2, 3, \ldots, L$ and $i=2, 3, \ldots N^k$ when said link-similarity exceed said similarity threshold whereby said system generated links can be generated without a data-object size limitation.

7. The link management system of claim 6 wherein:

said link-profile computing means further includes a term vector computing means for applying a Salton Vector Space computation to compute a plurality of term vectors for quantifying said user link profile and said link-similarity between every two of said data objects and said sub-data-objects.

8. A link management system provided for logging-on by a plurality of data-users for linking said data-users to a plurality of indexed data-objects distributed among a plurality of hypermedia databases, said link management system comprising:

a link manager for receiving a similarity threshold and a user input of a source data-object and a destination-data object in said hypermedia databases, said link manager includes a profile computing means for computing a user-link profile including a set of user-selected source term vectors for said user-selected source data-object and a set of user-selected destination term vectors for said user-selected destination data-object for representing an association of said source data-object to said destination data object;

said link manager further applying said sets of user-selected source term vectors to compute a source-node similarity between said user-selected source data-object and each of said data objects, said link manager further applying said sets of user-selected destination term vectors to compute a destination-node similarity between said user-selected destination data-object and each of said data objects;

an automatic link generator for automatically generating a system-generated link between a system generated source node having a source-node similarity exceeds said source-node similarity threshold and a system generated destination node having a destination-node similarity exceeds said destination-node similarity threshold whereby a plurality of system generated links can be generated between said system generated source node and said system generated destination node based only on a user input of said source data-object and said destination data-object without requiring a user input of keywords or other link-defining terms.

9. The link management system of claim 8 wherein:

a plurality of said indexed data-objects, represented by $D\text{-}Obj^k(1)$, where $k=1, 2, 3, \ldots, L$ and L is a positive integer, wherein each includes $N^k$ levels of sub-data-objects, represented by $D\text{-}Obj^k(i)$, where $i=2, 3, \ldots N^k$ and $N^k$ is a positive integer, wherein $D\text{-}Obj^k(i)$ includes several $D\text{-}Obj^k(i+1)$; and said automatic link generator generating a system-generated link between two of said indexed data objects including any two of said $D\text{-}Obj^K(1)$ and said sub-data-objects $D\text{-}Obj^k(i)$ for $k=1, 2, 3, \ldots, L$ and $i=2, 3, \ldots N^k$ when said link-similarity exceed said similarity threshold whereby said system generated links can be generated without a data-object size limitation.

10. The link management system of claim 9 wherein:

said link-profile computing means further includes a term vector computing means for applying a Salton Vector Space computation to compute a plurality of term vectors for quantifying said user link profile and said link-similarity between every two of said data objects and said sub-data-objects.

* * * * *